US012476425B2

(12) United States Patent
Rhodes et al.

(10) Patent No.: US 12,476,425 B2
(45) Date of Patent: Nov. 18, 2025

(54) CHARGING INLET ASSEMBLY HAVING A PROXIMITY RESISTOR ASSEMBLY

(71) Applicant: TE Connectivity Solutions GmbH, Schaffhausen (CH)

(72) Inventors: Clara Marguerite Rhodes, Winston Salem, NC (US); Hurley Chester Moll, Hershey, PA (US); Aaron James de Chazal, Rochester, MI (US); Matthew Bryan Hitchcock, Hershey, PA (US); Nathan Philip Myer, Lancaster, PA (US); Andrew Jacob Vasbinder, Boiling Springs, PA (US); Adam Price Tyler, Rochester Hills, MI (US); James Smith, King, NC (US); John Mark Myer, Middletown, PA (US); Kevin John Peterson, Kernersville, NC (US)

(*) Notice: Subject to any disclaimer, the term of this patent is extended or adjusted under 35 U.S.C. 154(b) by 635 days.

(21) Appl. No.: 17/961,703

(22) Filed: Oct. 7, 2022

(65) Prior Publication Data

US 2023/0116836 A1   Apr. 13, 2023

Related U.S. Application Data

(60) Provisional application No. 63/255,098, filed on Oct. 13, 2021.

(51) Int. Cl.
*H01R 13/66* (2006.01)
*B60L 53/16* (2019.01)

(52) U.S. Cl.
CPC .......... *H01R 13/6616* (2013.01); *B60L 53/16* (2019.02); *H01R 2201/26* (2013.01)

(58) Field of Classification Search
CPC .. H01R 13/6616; H01R 2201/26; B60L 53/16
USPC .......................................................... 320/109
See application file for complete search history.

(56) References Cited

U.S. PATENT DOCUMENTS

| 11,745,614 | B2* | 9/2023 | O'Connor | B60L 53/57 |
| | | | | 320/109 |
| 2013/0187600 | A1* | 7/2013 | Gale | H02J 7/02 |
| | | | | 320/109 |
| 2015/0084579 | A1* | 3/2015 | Li | H02J 7/007182 |
| | | | | 320/139 |
| 2015/0097525 | A1* | 4/2015 | DeDona | B60L 1/006 |
| | | | | 320/109 |

(Continued)

FOREIGN PATENT DOCUMENTS

| CN | 115708276 A | * | 2/2023 | ............... B60L 53/16 |
| CN | 115708277 A | * | 2/2023 | ............... B60L 53/16 |

*Primary Examiner* — Suresh Memula

(57) ABSTRACT

A charging inlet assembly includes a housing extending between a front and a rear. The housing has DC terminal channels and AC terminal channels. The charging inlet assembly includes AC terminals, include a proximity terminal and a ground terminal, received in the corresponding AC terminal channels. The charging inlet assembly includes DC terminals received in the corresponding DC terminal channels. The charging inlet assembly includes a proximity resistor assembly having a plug body holding a resistor, a first resistor conductor and a second resistor conductor. The first resistor conductor is coupled between the resistor and the terminating end of the proximity terminal. The second resistor conductor is coupled between the resistor and the terminating end of the ground terminal.

20 Claims, 10 Drawing Sheets

(56) References Cited

U.S. PATENT DOCUMENTS

| | | | |
|---|---|---|---|
| 2015/0097527 A1* | 4/2015 | DeDona | B60L 50/16 320/109 |
| 2015/0130414 A1* | 5/2015 | Izumi | H02J 5/00 320/109 |

* cited by examiner

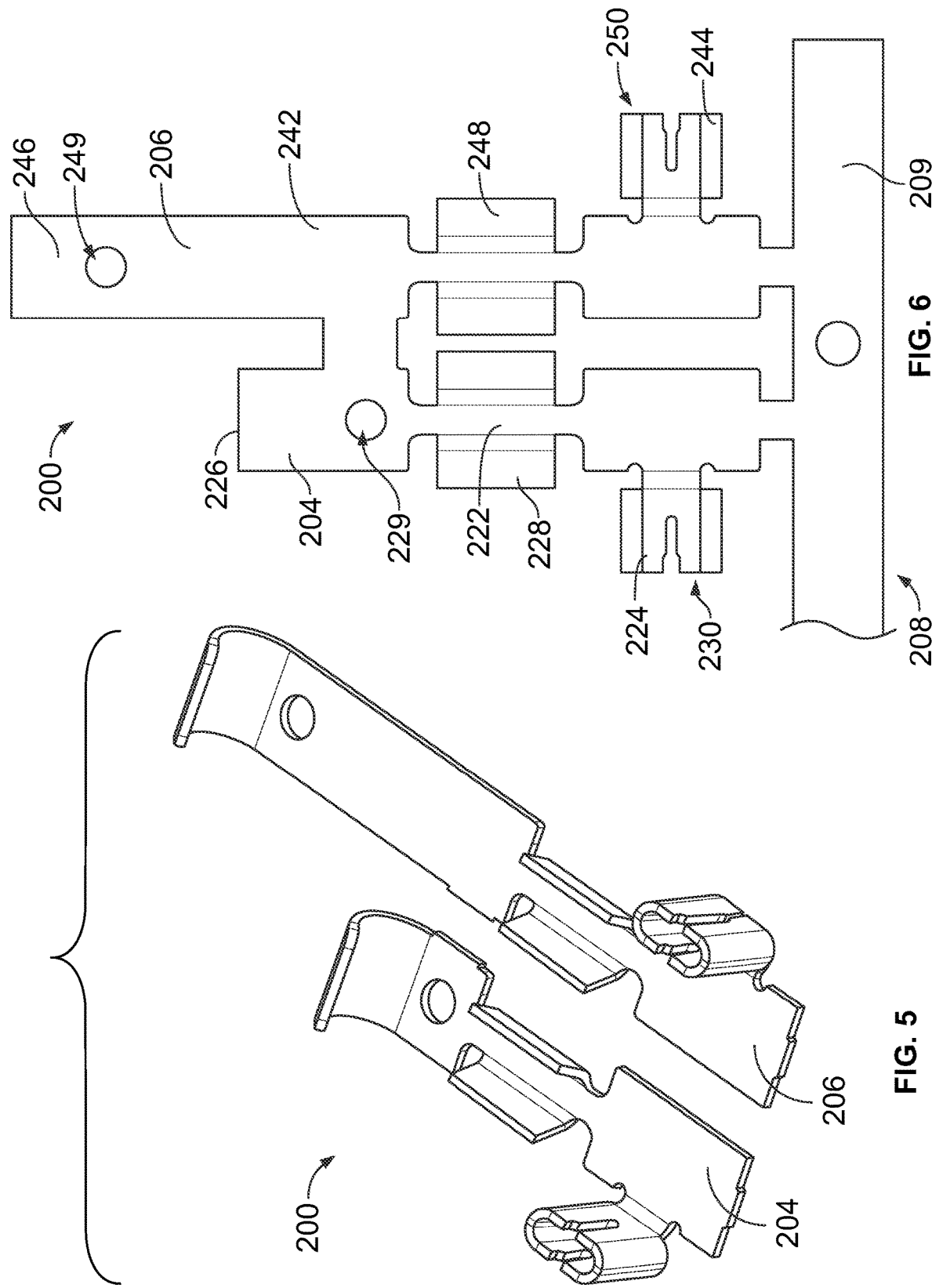

CHARGING INLET ASSEMBLY HAVING A PROXIMITY RESISTOR ASSEMBLY

CROSS REFERENCE TO RELATED APPLICATIONS

This application claims priority to U.S. Provisional Application No. 63/255,098, filed 13 Oct. 2021, the subject matter of which is herein incorporated by reference in its entirety.

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. Standards for electrical connectors for electric vehicles, such as the SAE J1772 North American Standard, have signaling protocols to detect connection of the charging plug to the vehicle. For example, the charging inlet assembly typically includes a control circuit board retained within the housing. The control circuit board includes a proximity circuit having a resistor connected between the proximity signal and the ground. The housing includes a large pocket at the rear of the housing that receives the control circuit board. The pocket and the control circuit board increase the overall size, complexity and cost of the charging inlet assembly.

A need remains for an improved charging inlet assembly.

BRIEF DESCRIPTION OF THE INVENTION

In one embodiment, a charging inlet assembly is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The charging inlet assembly includes AC terminals received in the corresponding AC terminal channels for mating with the AC charging connector. The AC terminals include a proximity terminal and a ground terminal. The proximity terminal includes a terminating end. The ground terminal includes a terminating end. The charging inlet assembly includes DC terminals received in the corresponding DC terminal channels for mating with the DC charging connector. The charging inlet assembly includes a proximity resistor assembly. The proximity resistor assembly includes a plug body holding a resistor, a first resistor conductor and a second resistor conductor. The first resistor conductor is coupled between the resistor and the terminating end of the proximity terminal. The second resistor conductor is coupled between the resistor and the terminating end of the ground terminal.

In another embodiment, a charging inlet assembly is provided and includes a housing extending between a front and a rear. The housing has a DC section includes DC terminal channels. The housing has an AC section includes AC terminal channels. The AC terminal channels extending along axes. The DC section configured for mating with a DC charging connector at the front. The AC section configured for mating with an AC charging connector at the front. The housing includes a resistor receptacle in an end wall at the rear. The charging inlet assembly includes AC terminals received in the corresponding AC terminal channels for mating with the DC charging connector. The AC terminals include a proximity terminal and a ground terminal. The proximity terminal includes a terminating end. The ground terminal includes a terminating end. The charging inlet assembly includes DC terminals received in the corresponding DC terminal channels for mating with the DC charging connector. The charging inlet assembly includes a proximity resistor assembly received in the resistor receptacle. The proximity resistor assembly includes a plug body holding a resistor, a first resistor conductor and a second resistor conductor. The plug body is side loaded into the resistor receptacle in a loading direction generally perpendicular to the axes of the AC terminal channels. The resistor has a first lead and a second lead. The first resistor contact terminated to the first lead and has a mating end coupled to the terminating end of the proximity terminal. The second resistor contact terminated to the second lead and has a mating end coupled to the terminating end of the ground terminal.

In a further embodiment, a charging inlet assembly is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The housing includes a resistor receptacle in an end wall at the rear. The resistor receptacle is open to at least two of the AC terminal channels. The charging inlet assembly includes AC terminals received in the corresponding AC terminal channels for mating with the AC charging connector. The AC terminals include a proximity terminal and a ground terminal. The proximity terminal includes a terminating end. The ground terminal includes a terminating end. The charging inlet assembly includes DC terminals received in the corresponding DC terminal channels for mating with the DC charging connector. The charging inlet assembly includes a proximity resistor assembly received in the resistor receptacle to interface with the proximity terminal and the ground terminal in the corresponding AC terminal channels. The proximity resistor assembly includes a plug body holding a resistor, a first resistor conductor and a second resistor conductor. The plug body includes a seal to seal off the resistor receptacle and the corresponding AC terminal channels. The first resistor conductor is coupled between the resistor and the terminating end of the proximity terminal. The second resistor conductor is coupled between the resistor and the terminating end of the ground terminal.

BRIEF DESCRIPTION OF THE DRAWINGS

FIG. 5 is a perspective view of a portion of the proximity resistor assembly showing the first and second resistor conductors in accordance with an exemplary embodiment.

FIG. 6 is a perspective view of a portion of a lead frame used to form the first and second resistor conductors in accordance with an exemplary embodiment.

DETAILED DESCRIPTION OF THE INVENTION

Figure 1:
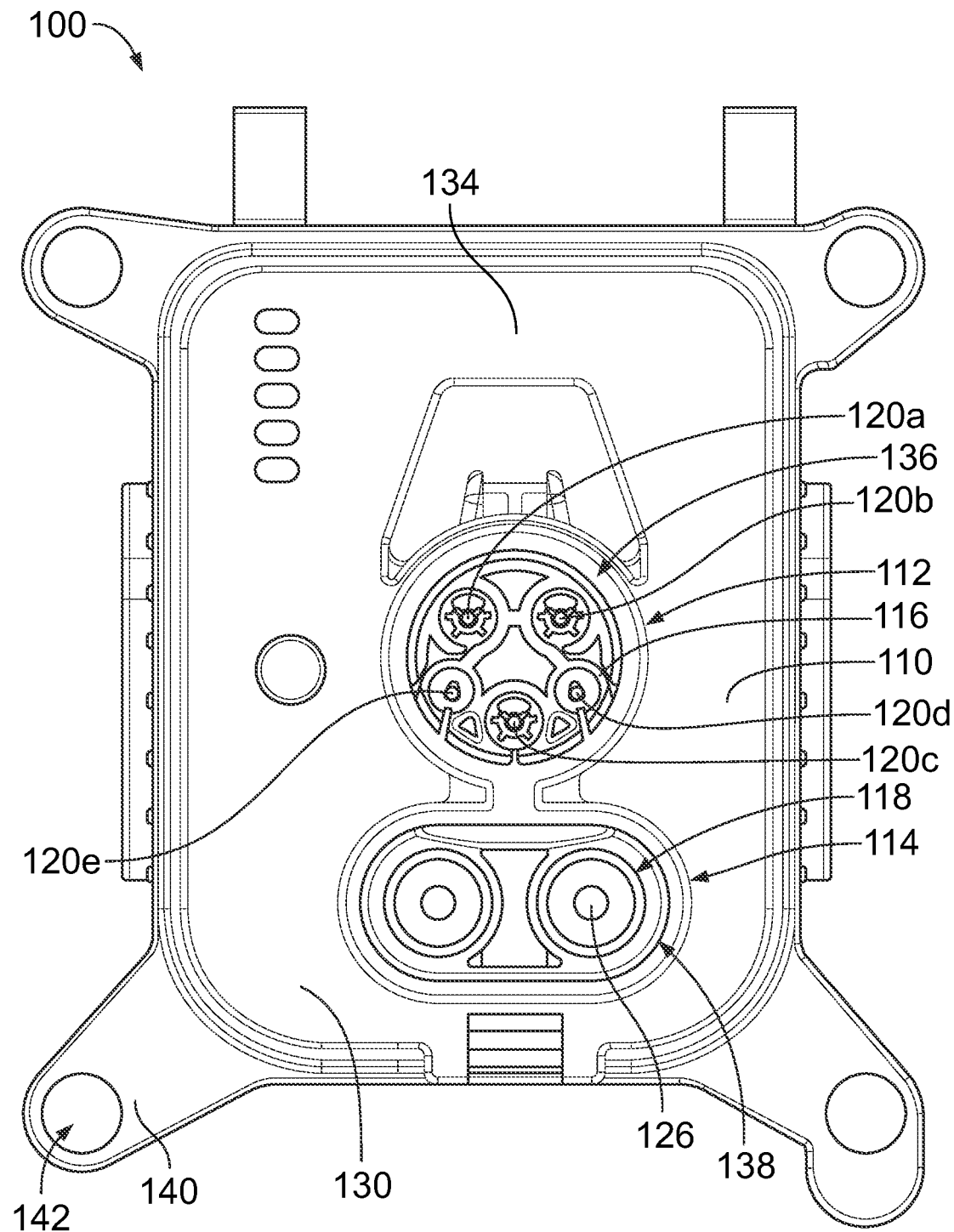
FIG. 1 is a front view of a charging inlet assembly including an AC charging module and a DC charging module in accordance with an exemplary embodiment.
Figure 2:
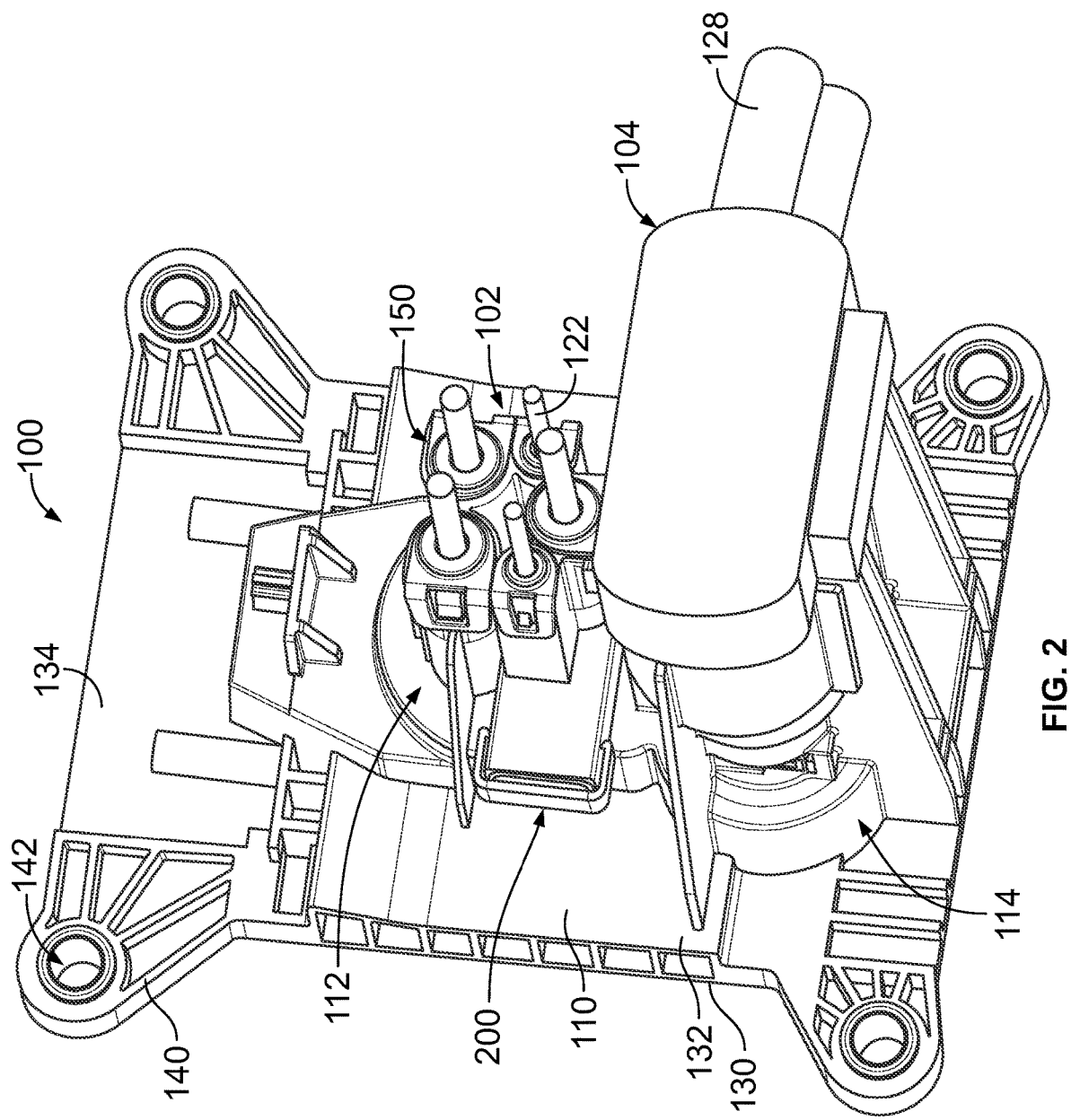
FIG. 2 is a rear perspective view of the charging inlet assembly showing the AC charging module and the DC charging module in accordance with an exemplary embodiment.

FIG. 1 is a front view of a charging inlet assembly 100 including an AC charging module 102 and a DC charging module 104 in accordance with an exemplary embodiment. FIG. 2 is a rear perspective view of the charging inlet assembly 100 showing the AC charging module 102 and the DC charging module 104 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The charging inlet assembly 100 includes AC terminals 120 at the AC section 112. The AC terminals 120 are held by the housing 110. The AC terminals 120 are received in corresponding AC terminal channels 116. In various embodiments, the AC terminals 120 may be part of the AC charging module 102 that is coupled to the housing 110. In the illustrated embodiment, five AC terminals 120 are provided, including a first AC charging terminal 120$a$, a second AC charging terminal 120$b$, a ground terminal 120$c$, a proximity terminal 120$d$, and a pilot terminal 120$e$. Optionally, the AC terminals 120 may be different sized terminals. In an exemplary embodiment, the AC terminals 120 includes pins at mating ends of the AC terminals 120. AC cables 122 are terminated to the AC terminals 120 and extend from the charging inlet assembly 100 to another component of the vehicle, such as the battery system of the vehicle. The AC terminals 120 are configured to be mated to the charging connector.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be socket connector configured to receive the charging plug. Seals may be provided at the interface of the low-voltage connector.

The charging inlet assembly 100 includes DC terminals 126 at the DC section 114. The DC terminals 126 are held by the housing 110. The DC terminals 126 are received in corresponding DC terminal channels 118. In various embodiments, the DC terminals 126 may be part of the DC charging module 104 that is coupled to the housing 110. In the illustrated embodiment, two DC terminals 126 are provided. In an exemplary embodiment, the DC terminals 126 includes pins at mating ends of the DC terminals 126. DC cables 128 are terminated to the DC terminals 126 and extend from the charging inlet assembly 100 to another component of the vehicle, such as the battery system of the vehicle. The DC terminals 126 are configured to be mated to the charging connector.

In an exemplary embodiment, the DC section 114 of the charging inlet assembly 100 defines a high-voltage connector configured to be coupled to the high-voltage portion of the charging connector. The high-voltage connector (for example, the DC terminals 126 and the DC cables 128) is configured to be coupled to other components in the system, such as the battery and/or the battery distribution unit of the vehicle. The high-voltage connector is used for fast charging of the battery. The high-voltage connector may be socket connector configured to receive the charging plug. Seals may be provided at the interface of the high-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. In an exemplary embodiment, the housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 126 that receive the charging connector. The DC charging connector is configured to be plugged into the DC socket 138. During charging, the DC charging connector is plugged into the DC socket 138 to electrically connect to the DC terminals 126. The panel 134 may surround the AC socket 136 and the DC socket 138 at the front 130.

In an exemplary embodiment, the housing 110 includes one or more cavities 150 at the rear 132 that receive the terminals, such as the AC terminals 120 and/or the DC terminals 124. In an exemplary embodiment, the charging inlet assembly 100 includes a proximity resistor assembly 200 at the rear of the housing 110. In an exemplary embodiment, the proximity resistor assembly 200 provides a resistor between the proximity terminal 120d and the ground terminal 120c, such as for operating a signaling protocol for performing the charging operation. In an exemplary embodiment, the proximity resistor assembly 200 is configured to be side loaded into the housing 110 to mate with the proximity terminal 120d and the ground terminal 120c. The proximity resistor assembly 200 may be mated with the proximity terminal 120d and the ground terminal 120c at separable mating interfaces. In various embodiments, the proximity resistor assembly 200 is mated with the proximity terminal 120d and the ground terminal 120c after the proximity terminal 120d and the ground terminal 120c are loaded into the housing 110. In alternative embodiments, the proximity resistor assembly 200 is coupled to the housing 110 and positioned in the housing 110 for mating with the proximity terminal 120d and the ground terminal 120c prior to loading the proximity terminal 120d and the ground terminal 120c into the housing 110.

In an exemplary embodiment, the housing 110 includes mounting tabs 140 used for mounting the housing 110 to the vehicle. The mounting tabs 140 having openings 142 that receive fasteners (not shown) to secure the charging inlet assembly 100 to the vehicle. Other types of mounting features may be used to secure the charging inlet assembly 100 to the vehicle. In various embodiments, the charging inlet assembly 100 may include a mounting flange (not shown) coupled to the front of the housing 110 for mounting the charging inlet assembly 100 to the vehicle. The housing 110 and/or the mounting flange may include a seal (not shown) to seal the charging inlet assembly 100 to the vehicle. In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

Figure 3:
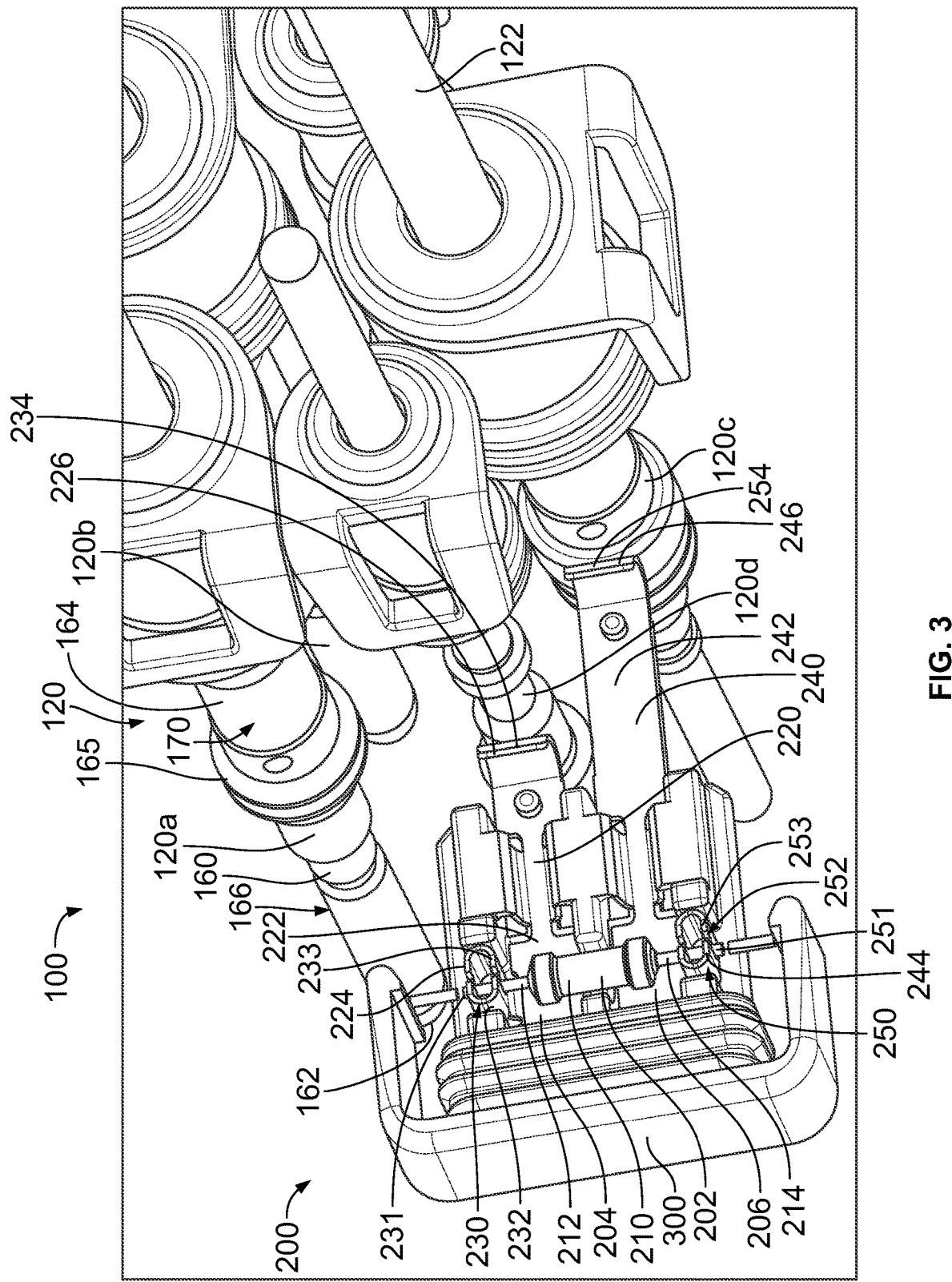
FIG. 3 is a rear perspective, exploded view of a portion of the charging inlet assembly in accordance with an exemplary embodiment.

FIG. 3 is a rear perspective, exploded view of a portion of the charging inlet assembly 100 in accordance with an exemplary embodiment. FIG. 3 shows a plurality of the AC terminals 120. For example, the first and second AC charging terminals 120a, 120b, the ground terminal 120c, the proximity terminal 120d, and the pilot terminal 120e are shown in FIG. 3. FIG. 3 shows the proximity resistor assembly 200 coupled to the AC terminals 120, such as the ground terminal 120c and the proximity terminal 120d.

Each AC terminal 120 includes a main body 160 extending between a mating end 162 and a terminating end 164. In an exemplary embodiment, a terminal seal 165 is coupled to the main body 160. The terminal seal 165 is configured to be sealed to the housing 110 (FIG. 2) when the AC terminal 120 is received in the AC terminal channel 116 (FIG. 1). The AC terminal 120 includes a mating pin 166 at the mating end 162. The mating pin 166 is presented at the front 130 of the housing 110 for mating with the charging connector. The AC terminal 120 includes an AC contact 170 at the terminating end 164 for electrical connection with the AC cables 122. The AC contact 170 is configured to be electrically connected to the terminating end 164 of the AC terminal 120, such as being press-fit onto a post at the terminating end 164, or welding or soldering to the terminating end. Other types of terminating ends may be provided in alternative embodiments, such as a weld pad or a crimp barrel.

In an exemplary embodiment, the proximity resistor assembly 200 includes a resistor 202, a first resistor conductor 204 and a second resistor conductor 206. The proximity resistor assembly 200 includes a plug body 300 holding the resistor 202, the first resistor conductor 204, and the second resistor conductor 206. The resistor 202, the first resistor conductor 204, and the second resistor conductor 206 are held in the housing 110 by the plug body 300. The plug body 300 is configured to be plugged into the housing 110 to position the first resistor conductor 204 and the second resistor conductor 206 for mating with the corresponding AC terminals 120. The first resistor conductor 204 is configured to be coupled between the resistor 202 and the proximity terminal 120d. The second resistor conductor 206 is configured to be coupled between the resistor 202 and the ground terminal 120c.

The resistor 202 includes a resistor element 210, a first lead 212 extending from a first side of the resistor element 210 and a second lead 214 extending from a second side of the resistor element 210. In an exemplary embodiment, the resistor 202 is a 2.7 kOhm resistor. However, the resistor 202 may have other resistance values in alternative embodiments.

In an exemplary embodiment, the first resistor conductor 204 includes a first resistor contact 220. The first resistor contact 220 is a stamped and formed contact. The first resistor contact 220 includes a main body 222, a first mating tab 224 extending from the main body 222 and a second mating tab 226 extending from the main body 222. The first mating tab 224 is configured to be coupled to the first lead 212 of the resistor 202. In various embodiments, the first mating tab 224 includes an insulation displacement contact 230 having a slot 232 between mating fingers 231, 233. The first lead 212 is received in the slot 232 and electrically connected to the fingers 231, 233. The fingers 231, 233 may be press-fit onto the first lead 212. The first mating tab 224 may be electrically connected to the first lead 212 by other processes in alternative embodiments, such as being welded or soldered to the first lead 212 or being crimped to the first lead 212. The second mating tab 226 includes a spring beam 234 configured to engage the AC terminal 120. For example, the second mating tab 226 may engage the terminating end 164 of the AC terminal 120 when the first resistor contact 220 is loaded into the housing 110. The second mating tab 226 may be spring biased against the terminating end 164 of the AC terminals 120 when mated thereto to maintain mechanical and electrical connection between the second mating tab 226 and the AC terminal 120. In an exemplary embodiment, the second mating tab 226 mates to the terminating end 164 at a separable mating interface.

In an exemplary embodiment, the second resistor conductor 206 includes a second resistor contact 240. The second resistor contact 240 is a stamped and formed contact. The second resistor contact 240 includes a main body 242, a first mating tab 244 extending from the main body 242 and a second mating tab 246 extending from the main body 242. The first mating tab 244 is configured to be coupled to the second lead 214 of the resistor 202. In various embodiments, the first mating tab 244 includes an insulation displacement contact 250 having a slot 252 between mating fingers 251, 253. The first lead 212 is received in the slot 252 and electrically connected to the fingers 251, 253. The fingers 251, 253 may be press-fit onto the first lead 212. The first mating tab 244 may be electrically connected to the second lead 214 by other processes in alternative embodiments, such as being welded or soldered to the second lead 214 or being crimped to the second lead 214. The second mating tab 246 includes a spring beam 254 configured to engage the AC terminal 120. For example, the second mating tab 246 may engage the terminating end 164 of the AC terminal 120 when the second resistor contact 240 is loaded into the housing 110. The second mating tab 246 may be spring biased against the terminating end 164 of the AC terminals 120 when mated thereto to maintain mechanical and electrical connection between the second mating tab 246 and the AC terminal 120. In an exemplary embodiment, the second mating tab 246 mates to the terminating end 164 at a separable mating interface.

Figure 4:
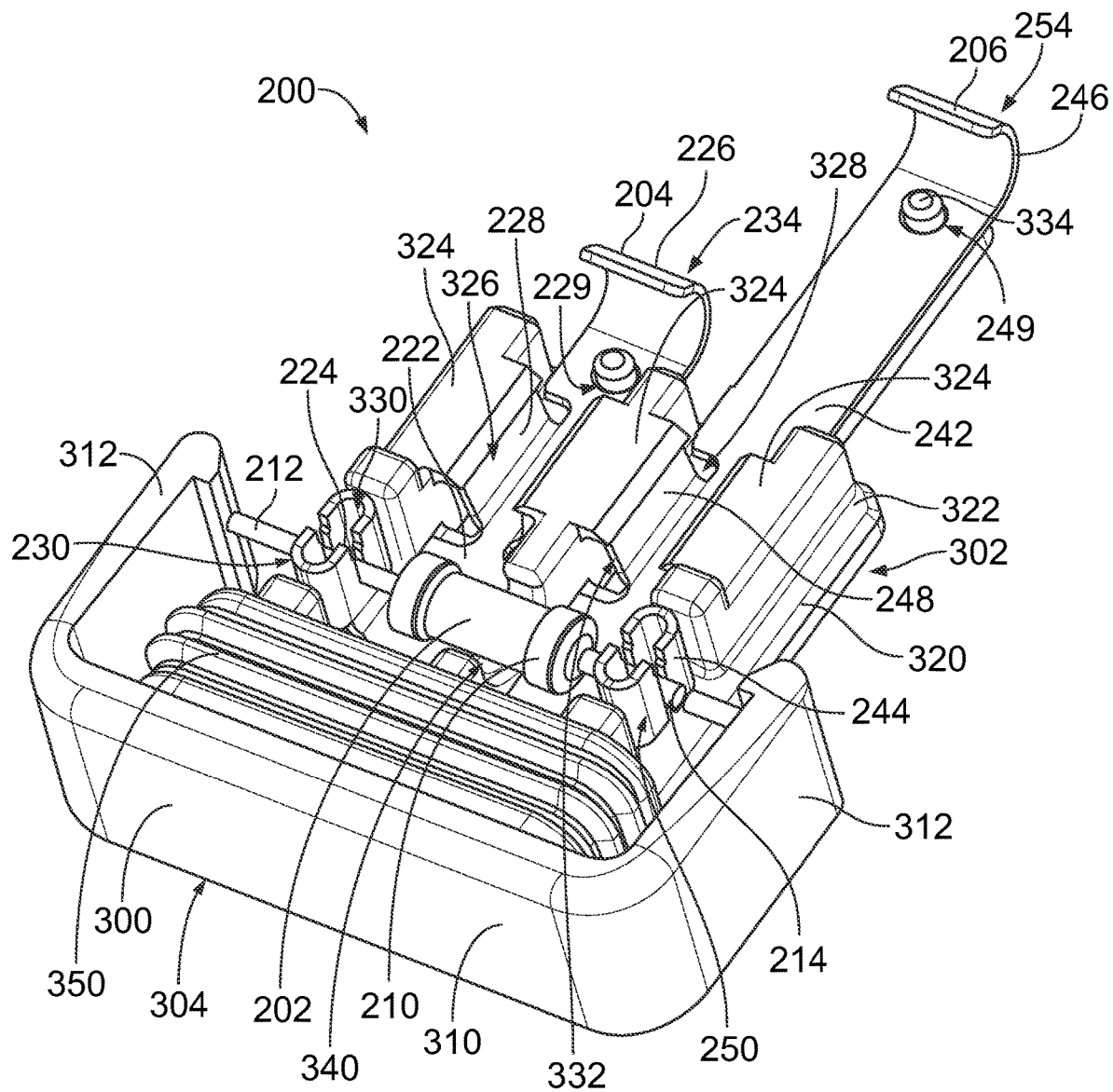
FIG. 4 is a perspective view of the proximity resistor assembly in accordance with an exemplary embodiment showing the resistor and the first and second resistor conductors assembled in the plug body.

FIG. 4 is a perspective view of the proximity resistor assembly 200 in accordance with an exemplary embodiment showing the resistor 202 and the first and second resistor conductors 204, 206 assembled in the plug body 300. FIG. 5 is a perspective view of a portion of the proximity resistor assembly 200 showing the first and second resistor conductors 204, 206. FIG. 6 is a perspective view of a portion of a lead frame 208 used to form the first and second resistor conductors 204, 206.

In an exemplary embodiment, the first and second resistor conductors 204, 206 are manufactured from the stamped and formed lead frame 208. The first and second resistor conductors 204, 206 may be stamped from a metal sheet and held together by a carrier 209 of the lead frame 208, which is later separated during a stamping process to isolate the first and second resistor conductors 204, 206. Multiple sets of the first and second resistor conductors 204, 206 may be stamped with the lead frame 208 and held by the carrier 209.

The first resistor conductor 204 includes the main body 222 with the first and second mating tabs 224, 226 at opposite ends of the main body 222. In an exemplary embodiment, the main body 222 includes locating tabs 228 along the main body 222. The locating tabs 228 are used to locate the first resistor conductor 204 within the plug body 300. Optionally, the locating tabs 228 may be approximately centered between the first and second mating tabs 224, 226. The locating tabs 228 may be bent upward out of the plane of the main body 222 to interface with the plug body 300. Other types of locating features may be used in alternative embodiments. The first mating tab 224 includes the insulation displacement contact 230 for connection with the first lead 212 of the resistor 202. The second mating tab 226 includes the spring beam 234 for mating engagement with the corresponding AC terminal 120. In the illustrated embodiment, the spring beam 234 is curved at the end to define a separable mating interface for mating with the AC terminal 120. In the illustrated embodiment, the first resistor conductor 204 is shorter than the second resistor conductor 206. In an exemplary embodiment, the main body 222 includes an opening 229 that receives a portion of the plug body 300 to position the first resistor conductor 204 relative to the plug body 300. The main body 222 may include other types of locating features to position the first resistor conductor 204 relative to the plug body 300.

The second resistor conductor 206 includes the main body 242 with the first and second mating tabs 244, 246 at opposite ends of the main body 242. In an exemplary embodiment, the main body 242 includes locating tabs 248 along the main body 242. The locating tabs 248 are used to locate the second resistor conductor 206 within the plug body 300. Optionally, the locating tabs 248 may be approximately centered between the first and second mating tabs 244, 246. The locating tabs 248 may be bent upward out of the plane of the main body 242 to interface with the plug body 300. Other types of locating features may be used in alternative embodiments. The first mating tab 244 includes the insulation displacement contact 250 for connection with the second lead 212 of the resistor 202. The second mating tab 246 includes the spring beam 254 for mating engagement with the corresponding AC terminal 120. In the illustrated embodiment, the spring beam 254 is curved at the end to define a separable mating interface for mating with the AC terminal 120. In the illustrated embodiment, the second resistor conductor 206 is longer than the first resistor conductor 204. In an exemplary embodiment, the main body 242 includes an opening 249 that receives a portion of the plug body 300 to position the second resistor conductor 206 relative to the plug body 300. The main body 242 may include other types of locating features to position the second resistor conductor 206 relative to the plug body 300.

The plug body 300 is used to support the resistor 202 and the first and second resistor conductors 204, 206. In an exemplary embodiment, the plug body 300 is manufactured from a dielectric material, such as a plastic material. The plug body 300 may be manufactured by a molding process. Optionally, the plug body 300 may be overmolded over the lead frame 208. Alternatively, the first and second resistor conductors 204, 206 may be coupled to the plug body 300 during assembly.

The plug body 300 includes an inner body 302 and an outer body 304. The inner body 302 is located at a front of the plug body 300 and the outer body 304 is located at a rear of the plug body 300. The inner body 302 is configured to be plugged into the housing 110 (FIG. 1). The outer body 304 is configured to be located exterior of the housing 110. In an exemplary embodiment, the outer body 304 includes a handle 310 at the rear that allows handling of the plug body 300, such as loading and unloading of the plug body 300 into the housing 110. In an exemplary embodiment, the outer body 304 includes one or more latches 312 used to latchably couple the plug body 300 to the housing 110. The latches 312 may be provided along the opposite sides of the plug body 300 in various embodiments. The latches 312 are deflectable and may be released from the housing 110 to remove the plug body 300 from the housing 110. Other types of securing features may be used in alternative embodiments.

In an exemplary embodiment, the inner body 302 includes a platform or tray 320 that extends to the front of the plug body 300. The tray 320 supports the first and second resistor conductors 204, 206. For example, the first and second resistor conductors 204, 206 may extend along an upper surface 322 of the tray 320. The inner body 302 includes walls 324 extending from the tray 320 that define first and second pockets 326, 328. The first pocket 326 receives the first resistor conductor 204. The second pocket 328 receives the second resistor conductor 206. The walls 324 are used to position the first and second resistor conductors 204, 206 in the first and second pockets 326, 328. The walls 324 include openings 330 that receives the mating tabs 226, 246 of the first and second resistor conductors 204, 206. The walls 324 include channels or grooves 332 that receive the locating tabs 228, 248. The locating tabs 228, 248 may be captured in the grooves 332 to hold the first and second resistor conductors 204, 206 in the pockets 326, 328. In an exemplary embodiment, the inner body 302 includes locating posts 334 extending from the upper surface 322 of the tray 320. The locating posts 334 receive the openings 229, 249 of the first and second resistor conductors 204, 206 to position the first and second resistor conductors 204, 206 along the tray 320. The locating posts 334 may be heat staked to retain the first and second resistor conductors 204, 206 on the tray 320.

In an exemplary embodiment, the inner body 302 includes a resistor pocket 340 that receives the resistor 202. The resistor pocket 340 may be aligned with the openings 330 in the walls 324. The inner body 302 supports the resistor element 210 in the resistor pocket 340. The leads 212, 214 extend from the resistor element 210 for termination to the first and second resistor conductors 204, 206.

In an exemplary embodiment, the proximity resistor assembly 200 includes a seal 350 surrounding the inner body 302, such as at the rear end of the inner body 302. The seal 350 is used to provide environmental sealing for the housing 110, such as to prevent moisture and debris from entering the housing 110 at the plug body 300. The seal 350 is manufactured from an elastomer material, such as a rubber material.

Figure 7:
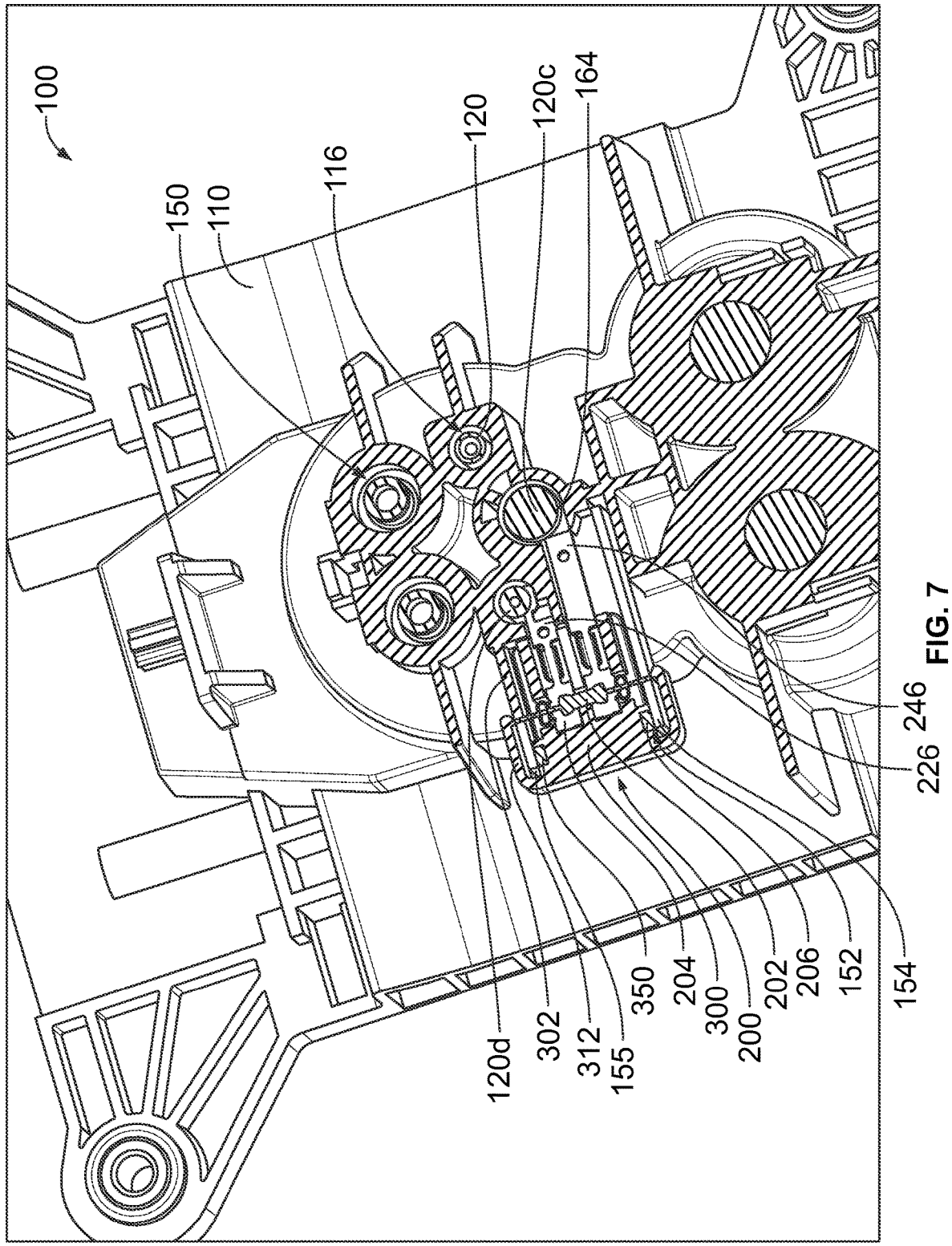
FIG. 7 is a partial sectional view of the charging inlet assembly in accordance with an exemplary embodiment showing the proximity resistor assembly coupled to the housing and the AC terminals.

FIG. 7 is a partial sectional view of the charging inlet assembly 100 in accordance with an exemplary embodiment showing the proximity resistor assembly 200 coupled to the housing 110 and the AC terminals 120. During assembly, the proximity resistor assembly 200 is loaded into the housing 110 and mated with the AC terminals 120 to electrically connect the corresponding AC terminals 120, such as the proximity terminal 120*d* and the ground terminal 120*c*, through the resistor 202.

In an exemplary embodiment, the housing 110 includes a resistor receptacle 152 in an end wall 154 of the housing 110. The end wall 154 is located at the rear of the housing 110. The end wall 154 may surround the cavities 150. The AC terminal channels 116 extend through the end wall 154. The resistor receptacle 152 is open at a side 155 of the end wall 154 to receive the proximity resistor assembly 200. For example, the resistor receptacle 152 receives the plug body 300, the resistor 202 and the first and second resistor conductors 204, 206. The resistor receptacle 152 is open to the corresponding AC terminal channels 116 for mating the first and second resistor conductors 204, 206 to the proximity terminal 120*d* and the ground terminal 120*c*. In an exemplary embodiment, the plug body 300 may be held in the resistor receptacle 152 by an interference fit.

In an exemplary embodiment, the proximity resistor assembly 200 is configured to be side loaded into the resistor receptacle 152. For example, the plug body 300 may be plugged into the resistor receptacle 152 through the sides 155 in a plugging direction that is generally perpendicular to the axes of the AC terminal channels 116. The seal 350 around the inner body 302 is received in the resistor receptacle 152. The seal 350 is configured to sealingly engage the housing 110 to seal off the resistor receptacle 152. When fully plugged, the latches 312 are latchably coupled to the housing 110 to secure the proximity resistor assembly 200 in the housing 110.

In various embodiments, the proximity resistor assembly 200 is mated with the proximity terminal 120*d* and the ground terminal 120*c* after the proximity terminal 120*d* and the ground terminal 120*c* are loaded into the housing 110. For example, the second mating tabs 226, 246 may be coupled to the terminating ends 164 when the proximity resistor assembly 200 is loaded into the resistor receptacle 152. In alternative embodiments, the proximity resistor assembly 200 is coupled to the housing 110 and positioned in the housing 110 for mating with the proximity terminal 120*d* and the ground terminal 120*c* prior to loading the proximity terminal 120*d* and the ground terminal 120*c* into the housing 110. The ground terminal 120*c* and the proximity terminal 120*d* are mated to the second mating tabs 226, 246 when the ground terminal 120*c* and the proximity terminal 120*d* are loaded into the AC terminal channels 116.

Figure 9:
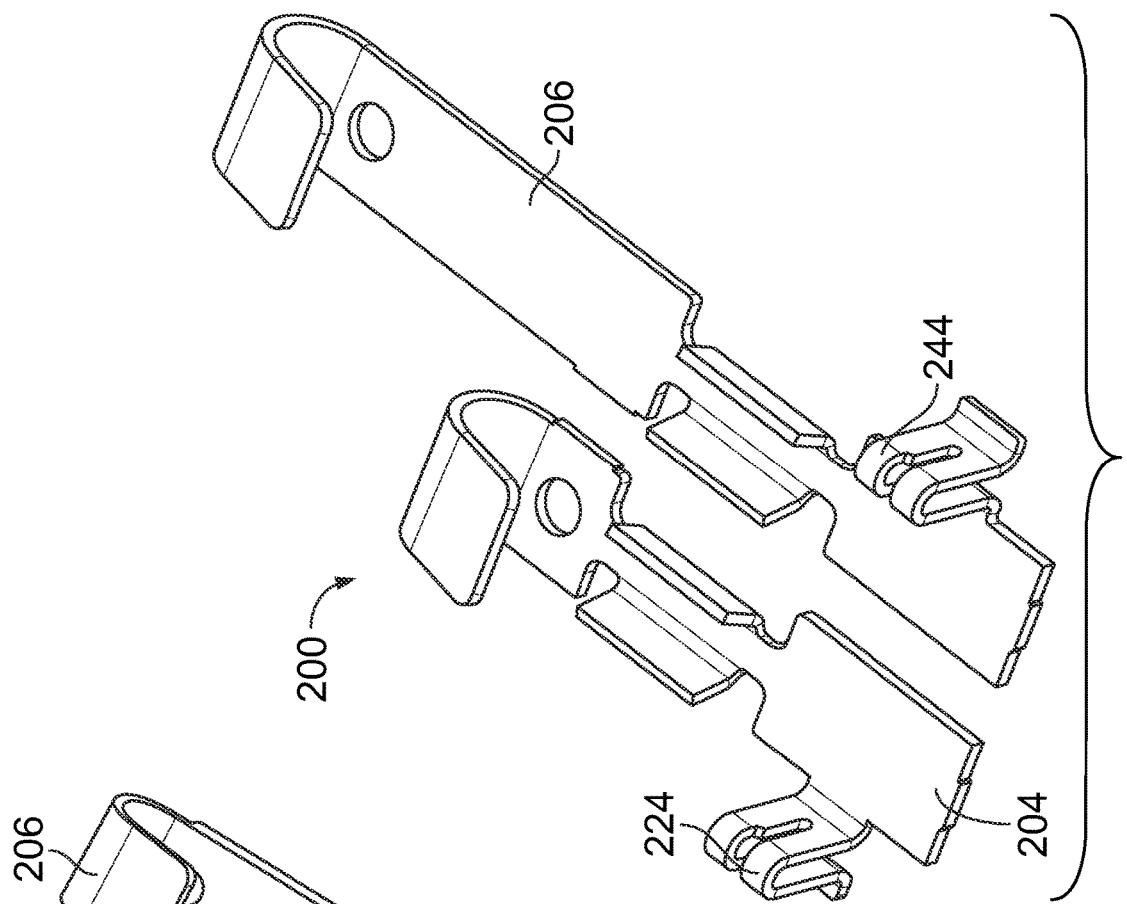
FIG. 9 is a perspective view of a portion of the proximity resistor assembly showing the first and second resistor conductors in accordance with an exemplary embodiment.
Figure 8:
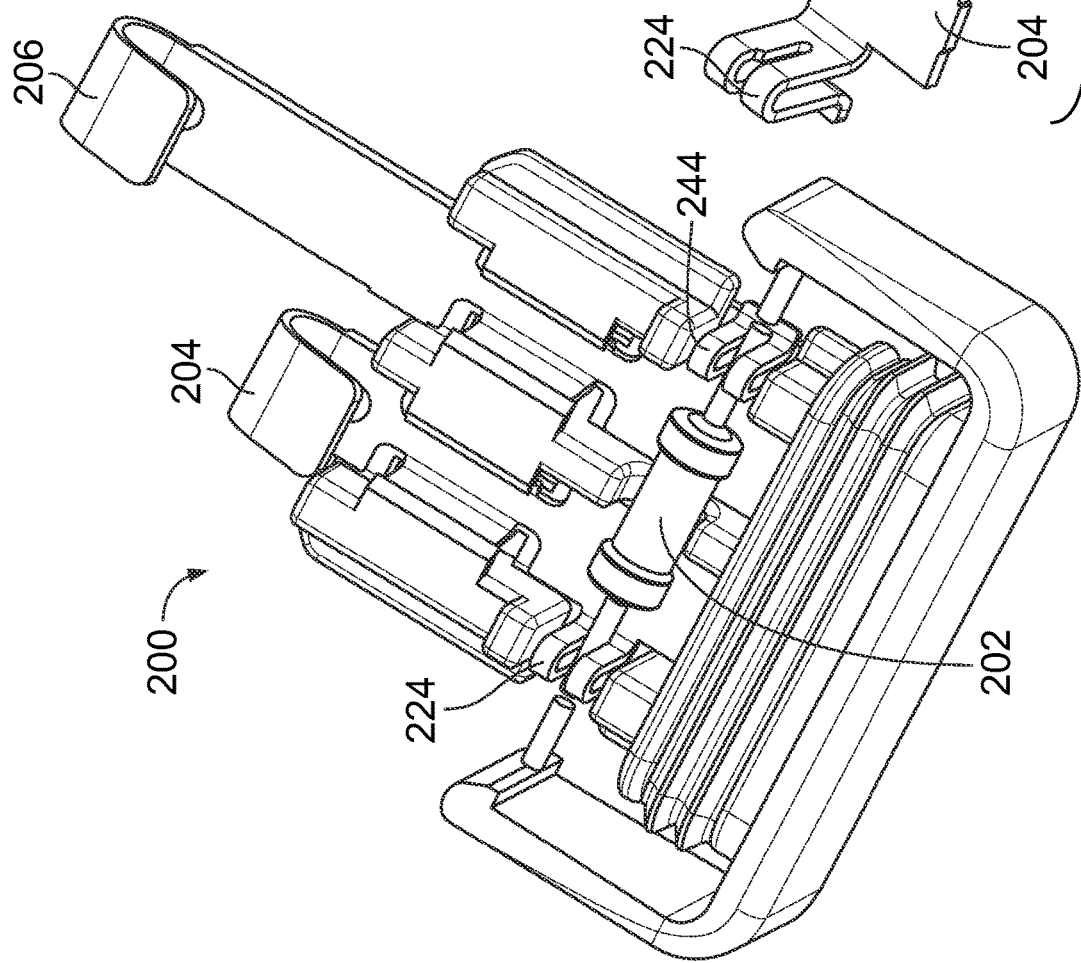
FIG. 8 is a perspective view of the proximity resistor assembly in accordance with an exemplary embodiment showing the resistor and the first and second resistor conductors assembled in the plug body.

FIG. 8 is a perspective view of the proximity resistor assembly 200 in accordance with an exemplary embodiment showing the resistor 202 and the first and second resistor conductors 204, 206 assembled in the plug body 300. FIG. 9 is a perspective view of a portion of the proximity resistor assembly 200 showing the first and second resistor conductors 204, 206. The embodiment of the proximity resistor assembly 200 shown in FIGS. 8 and 9 is similar to the embodiment of the proximity resistor assembly 200 shown in FIGS. 4 and 5. However, in the illustrated embodiment, the first mating tabs 224, 244 are formed differently. The first mating tabs 224, 244 are U-shaped having a single tab that is bent or folded over to form the insulation displacement slots. Other types of mating tabs may be used in alternative embodiments.

Figure 11:
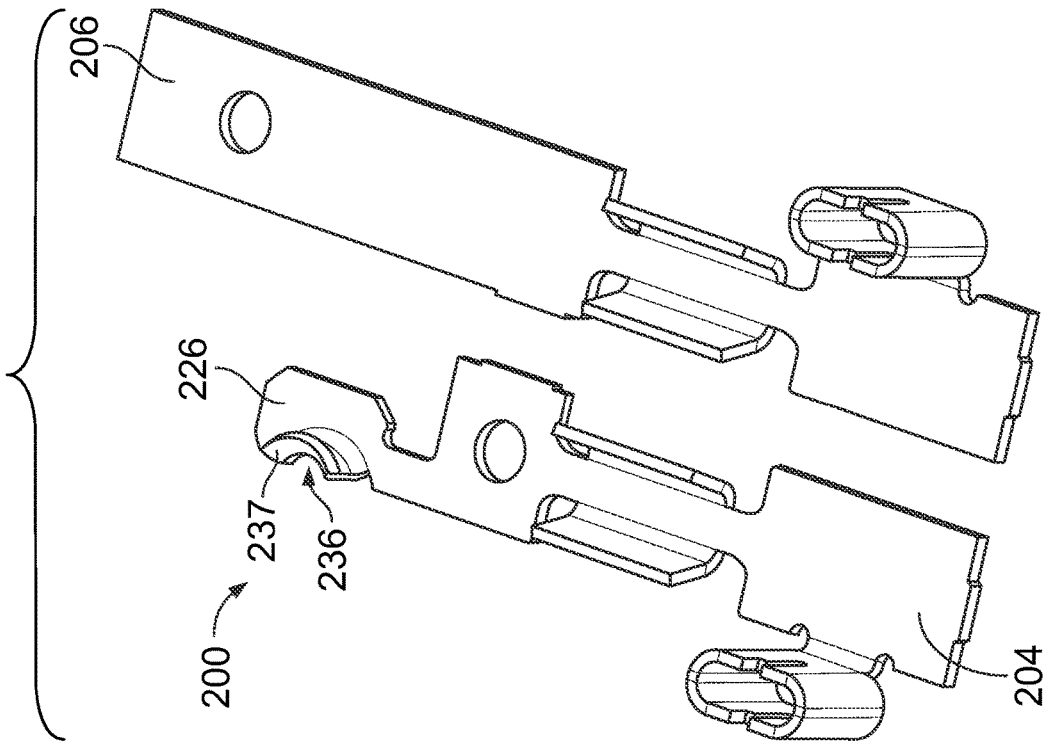
FIG. 11 is a perspective view of a portion of the proximity resistor assembly showing the first and second resistor conductors in accordance with an exemplary embodiment.
Figure 10:
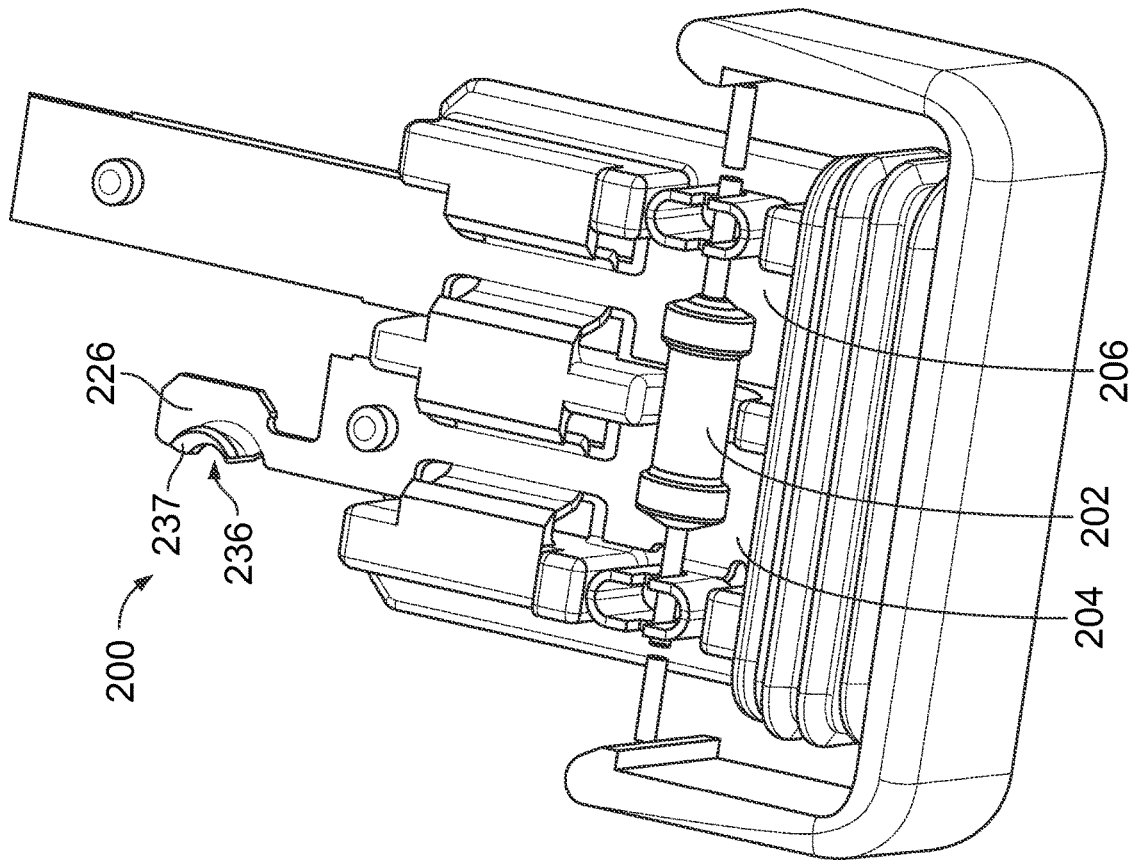
FIG. 10 is a perspective view of the proximity resistor assembly in accordance with an exemplary embodiment showing the resistor and the first and second resistor conductors assembled in the plug body.

FIG. 10 is a perspective view of the proximity resistor assembly 200 in accordance with an exemplary embodiment showing the resistor 202 and the first and second resistor conductors 204, 206 assembled in the plug body 300. FIG. 11 is a perspective view of a portion of the proximity resistor assembly 200 showing the first and second resistor conductors 204, 206. The embodiment of the proximity resistor assembly 200 shown in FIGS. 10 and 11 is similar to the embodiment of the proximity resistor assembly 200 shown in FIGS. 4 and 5. However, in the illustrated embodiment, the second mating tab 226 is formed differently. The second mating tab 226 is a side actuated spring configured to engage the AC terminal 120 from the side rather than at the end. The second mating tab 226 includes a pocket 236 at the side of the second mating tab 226 including a spring beam 237 extending into the pocket 226 to interface with the AC terminal 120. The second mating tab 226 has a reduced cross-section area that allows the end of the second mating tab 226 to flex during mating. Other types of mating tabs may be used in alternative embodiments.

Figure 12:
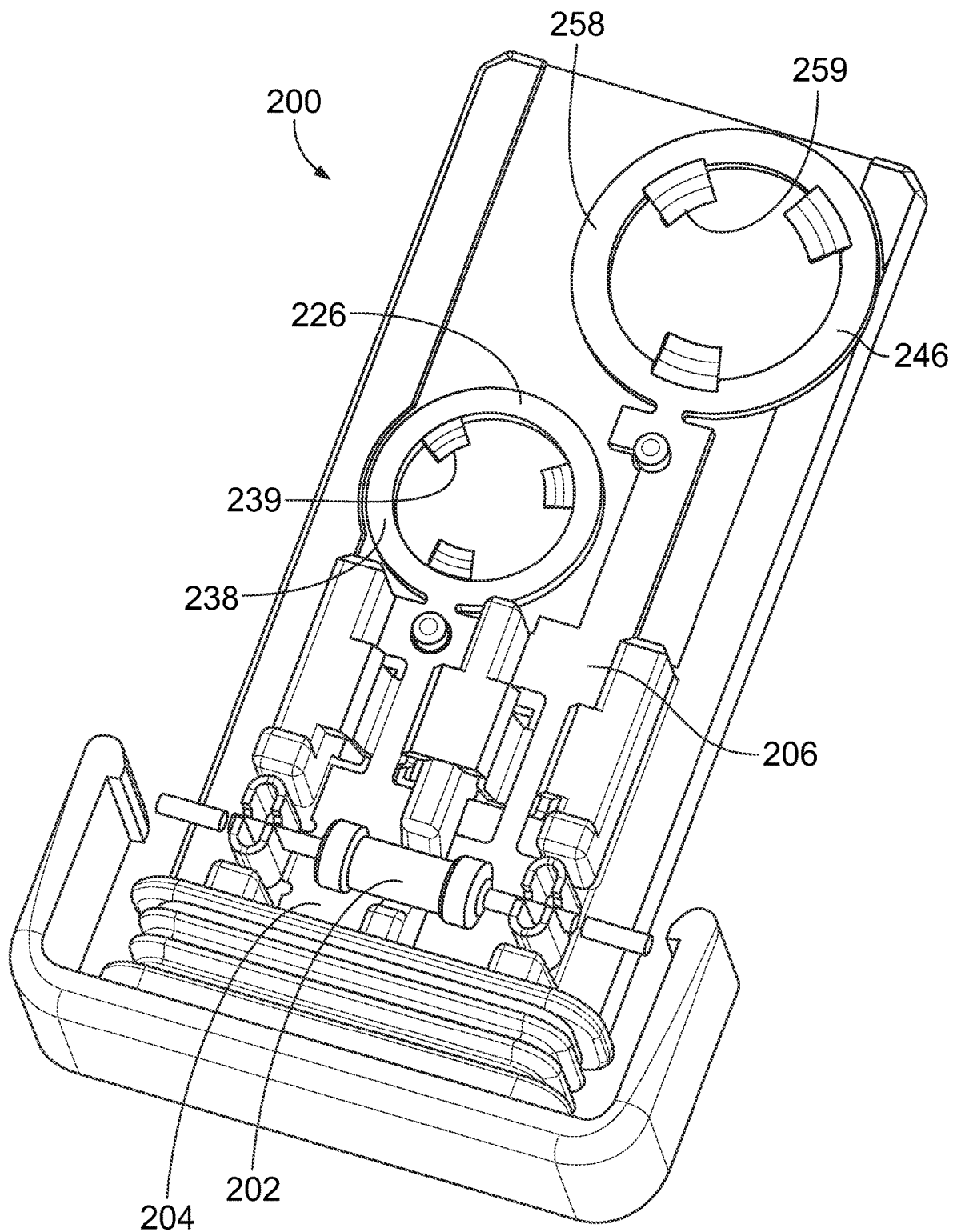
FIG. 12 is a perspective view of the proximity resistor assembly in accordance with an exemplary embodiment showing the resistor and the first and second resistor conductors assembled in the plug body.
Figure 13:
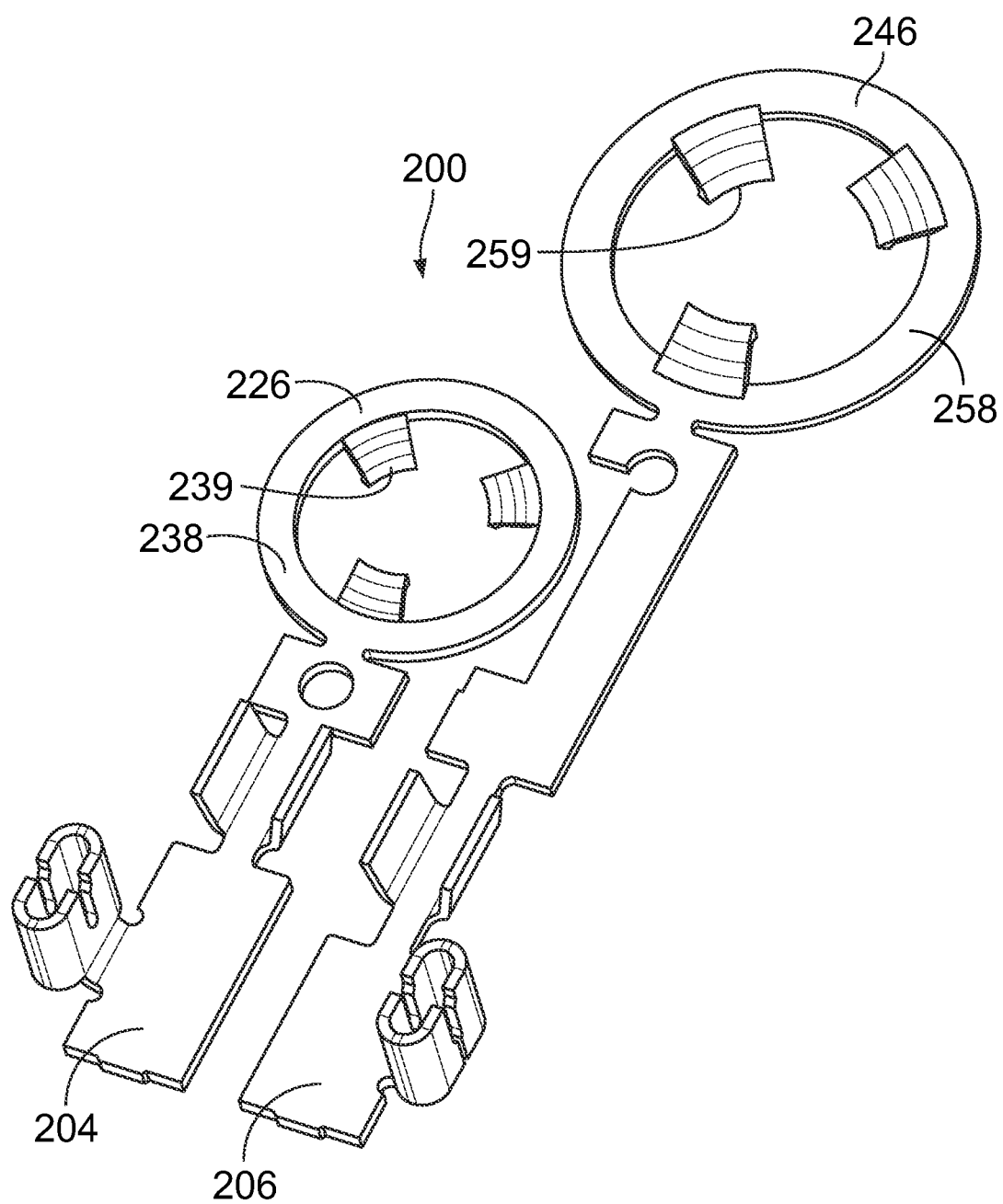
FIG. 13 is a perspective view of a portion of the proximity resistor assembly showing the first and second resistor conductors in accordance with an exemplary embodiment.

FIG. 12 is a perspective view of the proximity resistor assembly 200 in accordance with an exemplary embodiment showing the resistor 202 and the first and second resistor conductors 204, 206 assembled in the plug body 300. FIG. 13 is a perspective view of a portion of the proximity resistor assembly 200 showing the first and second resistor conductors 204, 206. The embodiment of the proximity resistor assembly 200 shown in FIGS. 12 and 13 is similar to the embodiment of the proximity resistor assembly 200 shown in FIGS. 4 and 5. However, in the illustrated embodiment, the second mating tabs 226, 246 are formed differently. The second mating tabs 226, 246 have rings 238, 258 that receive the AC terminal 120. The second mating tabs 226, 246 have spring beams 239, 259 extending into the rings 238 to interface with the AC terminal 120. Other types of mating tabs may be used in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front;
AC terminals received in the corresponding AC terminal channels for mating with the AC charging connector, the AC terminals including a proximity terminal and a ground terminal, the proximity terminal including a terminating end, the ground terminal including a terminating end;
DC terminals received in the corresponding DC terminal channels for mating with the DC charging connector; and
a proximity resistor assembly at the rear of the housing, the proximity resistor assembly including a plug body holding a resistor, a first resistor conductor and a second resistor conductor, the first resistor conductor being coupled between the resistor and the terminating end of the proximity terminal, the second resistor conductor being coupled between the resistor and the terminating end of the ground terminal.

2. The charging inlet assembly of claim 1, wherein the plug body includes an inner body and an outer body, the inner body being plugged into the housing, the outer body located exterior of the housing, the inner body supporting the first and second resistor conductors.

3. The charging inlet assembly of claim 1, wherein the proximity resistor assembly includes a seal coupled to the plug body, the seal being sealingly coupled to the housing.

4. The charging inlet assembly of claim 1, wherein the plug body includes a latch latchably coupled to the housing.

5. The charging inlet assembly of claim 1, wherein the AC terminal channels extend along channel axes, the plug body being side loaded into a resistor receptacle of the housing in a loading direction generally perpendicular to the channel axes.

6. The charging inlet assembly of claim 1, wherein the plug body includes a tray supporting the first and second resistor conductors, the tray including a first pocket receiving the first resistor conductor and a second pocket receiving the second resistor conductor, the plug body including a resistor pocket between the first and second pockets receiving the resistor.

7. The charging inlet assembly of claim 1, wherein the first resistor conductor includes a first resistor end coupled to the resistor and a first mating end including a spring beam having a separable mating interface coupled to the proximity terminal, the second resistor conductor including a second resistor end coupled to the resistor and a second mating end including a spring beam having a separable mating interface coupled to the ground terminal.

8. The charging inlet assembly of claim 1, wherein the first resistor conductor includes a first resistor end coupled to the resistor and a first mating end including a first ring configured to receive the proximity terminal and spring beams extending from the first ring being coupled to the proximity terminal, the second resistor conductor including a second resistor end coupled to the resistor and a second mating end including a second ring configured to receive the proximity terminal and spring beams extending from the second ring being coupled to the ground terminal.

9. The charging inlet assembly of claim 1, wherein the housing includes a resistor receptacle in an end wall at the rear open to the AC terminal channels holding the proximity terminal and the ground terminal, the plug body being received in the resistor receptacle to couple the first and second resistor conductors with the proximity terminal and the ground terminal.

10. The charging inlet assembly of claim 1, wherein the first resistor conductor includes a first resistor contact having a mating beam engaging the terminating end of the proximity terminal and a terminating end terminated to a first lead of the resistor, the second resistor conductor including a second resistor contact having a mating beam engaging the terminating end of the ground terminal and a terminating end terminated to a second lead of the resistor.

11. The charging inlet assembly of claim 9, wherein the terminating end of the first resistor contact includes an insulation displacement contact terminated to the first lead, the terminating end of the second resistor contact including an insulation displacement contact terminated to the second lead.

12. A charging inlet assembly comprising:
a housing extending between a front and a rear, the housing having a DC section including DC terminal channels, the housing having an AC section including AC terminal channels, the AC terminal channels extending along axes, the DC section configured for mating with a DC charging connector at the front, the AC section configured for mating with an AC charging connector at the front, the housing including a resistor receptacle in an end wall at the rear;
AC terminals received in the corresponding AC terminal channels for mating with the DC charging connector, the AC terminals including a proximity terminal and a ground terminal, the proximity terminal including a terminating end, the ground terminal including a terminating end;
DC terminals received in the corresponding DC terminal channels for mating with the DC charging connector; and
a proximity resistor assembly received in the resistor receptacle, the proximity resistor assembly including a plug body holding a resistor, a first resistor conductor and a second resistor conductor, the plug body being side loaded into the resistor receptacle in a loading direction generally perpendicular to the axes of the AC terminal channels, the resistor having a first lead and a second lead, the first resistor contact terminated to the first lead and having a mating end coupled to the terminating end of the proximity terminal, the second resistor contact terminated to the second lead and having a mating end coupled to the terminating end of the ground terminal.

13. The charging inlet assembly of claim 12, wherein the plug body includes an inner body and an outer body, the inner body being plugged into the housing, the outer body located exterior of the housing, the inner body supporting the first and second resistor conductors, the inner body having a seal being sealingly coupled to the housing.

14. The charging inlet assembly of claim 12, wherein the plug body includes a tray supporting the first and second resistor conductors, the tray including a first pocket receiving the first resistor conductor and a second pocket receiving the second resistor conductor, the plug body including a resistor pocket between the first and second pockets receiving the resistor.

15. The charging inlet assembly of claim 12, wherein the first resistor conductor includes a first resistor end coupled to the resistor and a first mating end including a spring beam having a separable mating interface coupled to the proximity terminal, the second resistor conductor including a second resistor end coupled to the resistor and a second mating end including a spring beam having a separable mating interface coupled to the ground terminal.

16. The charging inlet assembly of claim 1, wherein the first resistor conductor includes a first resistor contact having a mating beam engaging the terminating end of the proximity terminal and a terminating end having an insulation displacement contact terminated to the first lead of the resistor, the second resistor conductor including a second resistor contact having a mating beam engaging the terminating end of the ground terminal and a terminating end having an insulation displacement contact terminated to the second lead of the resistor.

17. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a resistor receptacle in an end wall at the rear, the resistor receptacle being open to at least two of the AC terminal channels;
AC terminals received in the corresponding AC terminal channels for mating with the AC charging connector, the AC terminals including a proximity terminal and a ground terminal, the proximity terminal including a terminating end, the ground terminal including a terminating end;
DC terminals received in the corresponding DC terminal channels for mating with the DC charging connector;
a proximity resistor assembly received in the resistor receptacle to interface with the proximity terminal and the ground terminal in the corresponding AC terminal channels, the proximity resistor assembly including a plug body holding a resistor, a first resistor conductor and a second resistor conductor, the plug body including a seal to seal off the resistor receptacle and the corresponding AC terminal channels, the first resistor conductor being coupled between the resistor and the terminating end of the proximity terminal, the second resistor conductor being coupled between the resistor and the terminating end of the ground terminal.

18. The charging inlet assembly of claim 17, wherein the plug body includes an inner body and an outer body, the inner body being plugged into the housing, the outer body located exterior of the housing, the inner body supporting the first and second resistor conductors, the inner body having a seal being sealingly coupled to the housing.

19. The charging inlet assembly of claim 17, wherein the AC terminal channels extend along channel axes, the plug body being side loaded into the resistor receptacle of the housing in a loading direction generally perpendicular to the channel axes.

20. The charging inlet assembly of claim 17, wherein the plug body includes a tray supporting the first and second resistor conductors, the tray including a first pocket receiving the first resistor conductor and a second pocket receiving the second resistor conductor, the plug body including a resistor pocket between the first and second pockets receiving the resistor.

* * * * *